W. WALLACE & J. KING.
Gasket.

No. 199,601. Patented Jan. 22, 1878.

UNITED STATES PATENT OFFICE.

WILLIAM WALLACE AND JOHN KING, OF ANSONIA, CONNECTICUT.

IMPROVEMENT IN GASKETS.

Specification forming part of Letters Patent No. 199,601, dated January 22, 1878; application filed December 19, 1877.

*To all whom it may concern:*

Be it known that we, WILLIAM WALLACE and JOHN KING, of Ansonia, in the county of New Haven and State of Connecticut, have invented a new Improvement in Gaskets; and we do hereby declare the following, when taken in connection with the accompanying drawings and the letters of reference marked thereon, to be a full, clear, and exact description of the same, and which said drawings constitute part of this specification, and represent, in—

Figure 1:
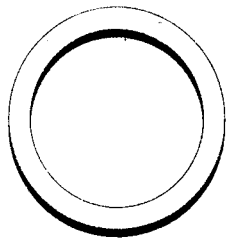
Figure 2:

Figure 1, a perspective view; Fig. 2, a transverse section.

This invention relates to an improvement in the manufacture of the article commonly called "gaskets"—that is to say, packing for steam and other joints. These have heretofore been made of rubber, leather, or other flexible or elastic material, and sometimes of lead or copper. Rubber and the like are soon destroyed. Lead is also susceptible to injury from steam, gas, &c., so as to be, like the first, impracticable for any long-continued service. The copper gaskets serve a very good purpose; but, in order to make the gasket easily adapt itself to the irregularity of the parts, the surfaces have been corrugated, so as to present sharp edges to the surface which is to be packed, and this packing-surface being so small, it is difficult to make a perfect joint.

The object of this invention is to produce a gasket having a copper or similar ductile-metal surface, with a body of softer material; and in such a gasket the invention consists.

From any suitable soft material—as, for instance, lead—the blank for the gasket is cut. This blank is then subjected to an electroplating process, and a deposit of copper made on its outer surface, so as to coat not only the packing sides, but the outer edges. Such a gasket therefore combines all the advantages of both the lead and copper gasket, the copper serving as a protection to the lead, and the lead yielding until a perfectly-packed joint is produced.

Instead of lead, other soft material may be used—as, for instance, a fine quality of felt or fabricated, fibrous, elastic, or flexible material. In the use of such a material it is necessary to prepare the surface for the deposit of copper—a process so well known to persons skilled in the art of electroplating as not to require a description in this specification.

In the drawing, solid black represents the body or softer portion of the gasket, and the surrounding or lighter portion shows the deposit of copper.

We claim—

The herein-described gasket, consisting of the soft body, as described, coated by an electro-deposit of copper, substantially as specified.

WILLIAM WALLACE.
JOHN KING.

Witnesses:
   THOS. J. WOOD,
   F. L. GAYLORD.